US006737155B1

(12) United States Patent
Ou

(10) Patent No.: US 6,737,155 B1
(45) Date of Patent: May 18, 2004

(54) PAPER OVERLAID WOOD BOARD AND METHOD OF MAKING THE SAME

(76) Inventor: Nian-hua Ou, 1791 Julian Dr., Watkinsville, GA (US) 30677

( * ) Notice: Subject to any disclaimer, the term of this patent is extended or adjusted under 35 U.S.C. 154(b) by 373 days.

(21) Appl. No.: 09/457,183

(22) Filed: Dec. 8, 1999

(51) Int. Cl.[7] .............................. D21J 1/00; B32B 3/00; B32B 5/12; B32B 29/02

(52) U.S. Cl. ................................ 428/292.4; 428/292.7; 428/105; 428/137

(58) Field of Search ........................... 428/292.4, 292.7, 428/105, 137

(56) References Cited

U.S. PATENT DOCUMENTS

| | | | | | |
|---|---|---|---|---|---|
| 3,308,013 | A | * | 3/1967 | Bryant | 162/103 |
| 3,654,044 | A | | 4/1972 | Hirota | |
| 4,361,612 | A | * | 11/1982 | Shaner et al. | 428/106 |
| 4,404,252 | A | | 9/1983 | Hetzler et al. | |
| 4,410,380 | A | | 10/1983 | Ahrweiler et al. | |
| 4,492,726 | A | | 1/1985 | Rosenberg | |
| 4,541,880 | A | | 9/1985 | Arena et al. | |
| 5,425,976 | A | | 6/1995 | Clarke et al. | |
| 5,718,786 | A | * | 2/1998 | Lindquist et al. | 156/62.2 |
| 5,879,781 | A | | 3/1999 | Mehta et al. | |
| 5,885,685 | A | * | 3/1999 | Tingley | 428/105 |
| 5,910,352 | A | * | 6/1999 | Tingley | 428/107 |
| 6,187,697 | B1 | * | 2/2001 | Jaffee et al. | 442/149 |

* cited by examiner

*Primary Examiner*—Cynthia H. Kelly
*Assistant Examiner*—L. Ferguson
(74) *Attorney, Agent, or Firm*—Carlos Nieves; David Mitchell Goodrich

(57) ABSTRACT

A paper overlaid wood product having a relatively low density. The board includes a core comprised of oriented strand board. A resin impregnated kraft paper overlay is adhesively secured to the top surface of the oriented strand board core. The paper overlaid wood board has a density ranging from about 35 $lb/ft^3$ to about 55 $lb/ft^3$, a modulus of rupture (MOR) of from about 3000 to about 9000 psi, a modulus of elasticity of about 0.4 million to about 1.2 million psi, and a thickness of about 0.25 inches to about 1.25 inches.

7 Claims, 3 Drawing Sheets

PAPER OVERLAID WOOD BOARD AND METHOD OF MAKING THE SAME

BACKGROUND OF THE INVENTION

1. Field of the Invention

The present invention is generally related to a paper overlaid wood board and, more particularly, to a paper overlaid, oriented strand board which has a smooth surface and is resistant to wood stain migration. The invention also relates to a method of making such a paper overlaid wood product.

2. Background Description

Oriented strand board is commercially available from a number of companies including J. M. Huber Corporation, Georgia-Pacific Corporation, Louisiana-Pacific, and a number of other sources. This material includes a plurality of wood "flakes" or "strands" bonded together by a binding material such as phenol formaldehyde resin or isocyanate resin together with sizing materials such as paraffinic waxes. The flakes are made by cutting thin slices with a knife edge parallel to the length of a debarked log. The flakes are typically 0.015 to 0.035 inches thick, although thinner and thicker flakes can be used in some applications, and are typically less than one inch to several inches long and less than one inch to a few inches wide. The flakes generally are longer than they are wide. In the fabrication of oriented strand board, the flakes are first dried to remove water, and are then coated with a thin layer of binder and sizing material. The coated flakes are then spread on a conveyor belt in a series of layers.

The layers of oriented "strands" or "flakes" are subjected to heat and pressure to fuse the strands and binder together. The resulting product is then cut to size and shipped. Typically, the resin and sizing comprise less than 10% by weight of the oriented strand board product. The fabrication of oriented strand boards is described in U.S. Pat. No. 5,525,394 to Clarke et al., and that patent is herein incorporated by reference. Oriented strand board has been used in sheathing walls, wooden I-beam structural supports, and in roofs and floors where strength, light weight, ease of nailing and dimensional stability under varying moisture conditions are the most important attributes. Oriented strand board is sold at a substantial discount compared to structural grades of soft plywood. The cost advantage of OSB over plywood is expected to increase as lumber shortages are expected due to limited resources.

However, the rough surface of OSB is undesirable in certain applications. For example, when OSB is used as flooring, the rough surface interferes with the attachment of a floor covering thereto. Further, individual strands are known to "pop up." This makes the installation of surface covering materials, such as vinyl, hardwood flooring and ceramic tiles more difficult.

One way to alleviate such problems is to sand the rough OSB surface. However, even with sanding, imperfections on the surface of the OSB may create an undesirable appearance and negatively affect the affixation of a floor covering thereto. Further, the exposed surface of the OSB is susceptible to water damage.

Another known method to hide the defects on the surface of the OSB is to cover the same with a wood veneer comprised of plywood. Securing a wood veneer to the surface of the OSB has its drawbacks. For example, it tends to be relatively expensive. Additionally, the wood veneer often contains surface defects itself. Moreover, in order to protect the wood veneer and the OSB core from damage caused by exposure to wet conditions, the surface of the wood veneer must be treated.

It should also be noted that when vinyl floor covering is installed directly onto a wood sub-floor or wood veneer, wood stains have the propensity to migrate from the wood into the vinyl causing discoloration of the vinyl sheet. These wood stains result from extractives usually found in the cambium or outer part of a tree which is adjacent to its bark. The types and amount of extractives vary with different types of woods and it is noted that Aspen and Southern yellow pine have substantial amounts of extractives capable of migrating, thereby staining adjacent materials. One way of curing this problem is to remove the outer layers of wood before using the remainder to product "strands". This, however, is not cost-effective and is wasteful of natural resources. Another way of dealing with the discoloration problem is to use an underlayment between the sub-floor and the vinyl covering, Obviously, this undesirably increases the cost of covering the floor.

SUMMARY OF THE INVENTION

In order to overcome the deficiencies of the prior art discussed above, there is provided a paper overlaid wood board that has a generally smooth surface and is not readily susceptible to water damage or stain migration. At least one surface of the oriented strand board core is covered with a resin impregnated paper overlay. The paper overlay preferably has a basis rate of about 25 lbs./msf to about 75 lbs./msf and a resin content of about 20% to about 60%. The finished board has a density ranging of about 35 lb/ft$^3$ to about 55 lb/ft$^3$, a modulus of rupture (MOR) of about 3000 to about 9000 psi, a modulus of elasticity (MOE) of about $0.4\times10^6$ to about $1.2\times10^6$ psi, and a thickness of about 0.25 inches to about 1.25 inches.

Other features and advantages will be readily apparent from the following detailed description of preferred embodiments thereof.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENT

Figure 1:
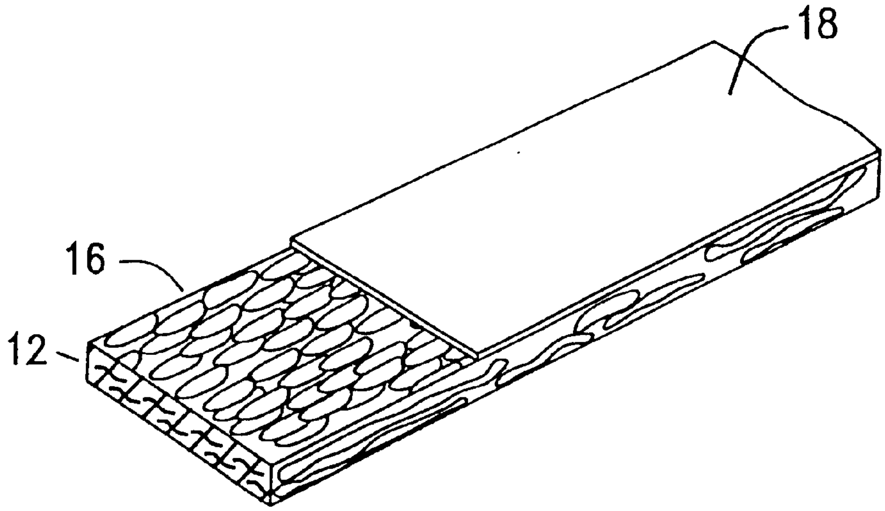
FIG. 1 is a perspective view of a paper overlaid wood board in accordance with the present invention.
Figure 2:
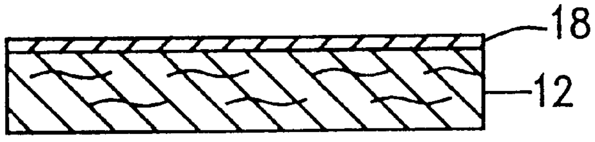
FIG. 2 is a cross-sectional view of the paper overlaid wood board of FIG. 1.
Figure 3:
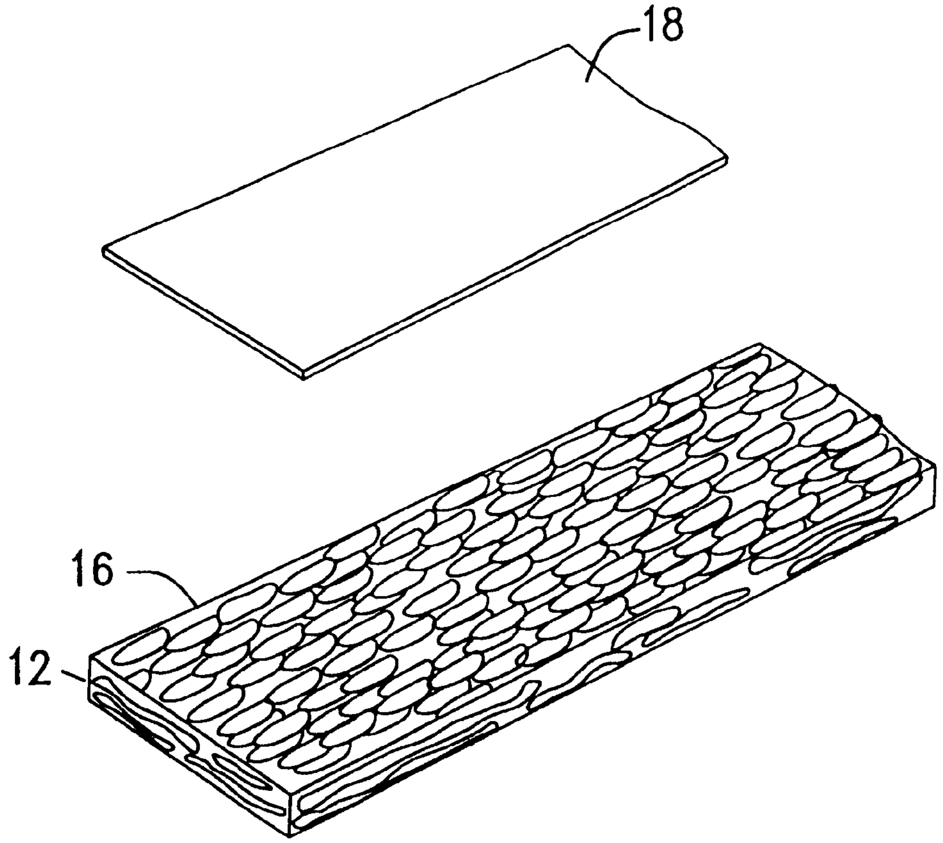
FIG. 3 is an exploded perspective view of the board of FIG. 1.

In accordance with the preceding summary, the present invention is directed toward a paper overlaid wood product with improved surface properties. Referring to FIGS. 1–3, the paper overlaid wood board 10 includes an oriented strand board core 12 having a bottom surface 14 and a top surface 16. A resin impregnated paper overlay 18 is secured to the top surface 16 of the oriented strand board core 12 in the manner set forth below.

The oriented strand board core 12 is comprised of a plurality of wood "flakes" or "strands" which are oriented parallel to each other. The strands are obtained by waferizing debarked Southern yellow pine wood logs in a manner known in the art. If desired, debarked Aspen wood may be used as a substitute for the Southern yellow pine. The size of the strands and the number of layers in the oriented strand board can vary to meet a wide range of design requirements. In the preferred embodiment, the strands have a thickness of about 0.015 inches to about 0.025 inches, a width of about 0.25 inches to about 1.5 inches and a length of about 3.0 inches to about 6.0 inches. The surface strands are preferably dried to a moisture content of about 3% to about 12% and the core strands are preferably dried to a moisture content of about 2% to about 8% by using a three-pass rotary dryer.

The strands are held together by a binding material such as 4,4, diphenylmethane-diisocyanate (MDI) and the oriented strand board core typically includes a wax based material for sizing. The oriented strand board core 12 can be produced by a variety of techniques; however, common to all fabrication processes is a step of subjecting the wood strands to high temperature and pressure to fuse and bind them together using the binding (resin or adhesive) material. Preferred binding materials include isocyanate and/or phenolic based resins such as 4,4, diphenylmethane-diisocyanate (MDI) and phenol-formaldehyde (PF). The binding material is preferably added in an amount of from about 1% to about 9% by weight (solids) and the wax is preferably added in an amount of from about 1% to about 3% by weight.

A preferred method of obtaining the paper overlaid OSB follows. The strands of wood flakes are coated with suitable amounts of binder and wax. The coated strands are formed into a mat that includes alternating layers of strands oriented generally perpendicular to one another in a manner known in the art (see, for example, U.S. Pat. No. 5,525,394). The basis weight of the mat is preferably about 1 lb/ft$^2$ to about 3 lb./ft$^2$.

Figure 4:
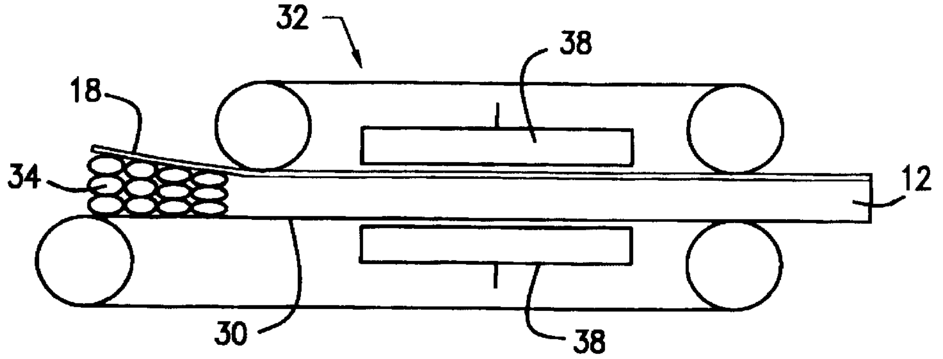
FIG. 4 is a schematic side view of a continuous board manufacturing system.

Referring to FIG. 4, after the mat 38 is formed, the resin impregnated paper overlay 18 is placed onto the top layer thereof. The paper overlay is composed of a saturating grade kraft paper and preferably has a basis weight of about 25 lbs./msf to about 75 lbs./msf and a resin content of about 20% to about 60% by dry weight. Phenol-formaldehyde resin or isocyanate resin (MDI) can be used for impregnating the kraft paper. A layer of phenol-formaldehyde resin is coated on the back side of the overlay paper as the glue line that will bond the overlay paper to the OSB core. The resin glue line is about 4 to 11 lbs./msf by dry weight. The preferred thickness of the paper overlay is about 0.015 inches. The paper overlaid mat is then transported via a conveyor 30 between platens 38 of a press machine 32 of a type known in the art. The overlaid mat is then pressed at a platen temperature of between 275° to about 450° F. for about 60 to about 600 seconds to produce a paper overlaid product 10. The maximum pressure applied to the mat is preferably from about 600 psi to about 900 psi. The continuous press 32 can be similar to those described in U.S. Pat. Nos. 5,520,530, 5,538,676, and 5,596,924, however a wide variety of continuous presses can be used in the practice of this invention.

It should be noted that the temperature and pressure employed by the press 32 could vary depending on the application and properties of the final product to be produced. Similarly, the residence time in the press can be varied and is dependent on the length of the press, the temperature of the press and the thickness of the product to be produced. The residence time in the press and the product properties may also be modified through the addition of catalysts or polyols to the binding material or the wood strands. It is preferred that the temperature, pressure, and time in the press 32 be selected to allow for complete curing of the binding material (adhesive or resin) and fusion with the wood material. In order to facilitate the releasing of the board from the press without delamination or blistering, the press or the flake mat is coated with a release agent. Typical release agents are wax-based release agents such as Blackhawk Specialty Chemical's EX-24 or soap-based release agents such as Hercule's #8315.

The finished paper overlaid wood board 10 preferably has a density ranging from about 35 lb/ft$^3$ to about 55 lb/ft$^3$, a modulus of rupture (MOR) of from about 3000 to about 9000 psi, a modulus of elasticity of about $0.4\times10^6$ to about $1.2\times10^6$ psi, and a thickness of about 0.25 inches to about 1.25 inches. The test method used to determine modulus of rupture and modulus of elasticity is described in ASTM D1037 "Standard Test Methods for Evaluating Properties of Wood-based Fiber and particle Panels Materials". Accordingly, the finished board exhibits high bending strength with a density that allows the board to be readily handled.

When the board is used as a sub-floor, the paper overlay prevents wood stains from migrating from the wood into the associated floor covering. This was established using a life test. For the test, two OSB panels were used, one of which included the paper overlay. The panels were 23/32 inches thick and had the same resin and wax loading (5% MDI and 2.1% wax). Three 1.5 inches ×3 inches samples were taken from each of the panels and white vinyl covering distributed by Armstrong was cut into pieces for covering a 1.5 inches ×3 inches side of each sample. The cut vinyl was held in abutment by rubber bands with the paper overlay on three of the samples and in abutment with an uncovered side of the other samples. The vinyl covered samples were then steamed in a steamer for 2.5 hours. The temperature in the steamer was 210° F. After the steaming, the panels were examined for stain migration. Findings are listed below.

| Sample | Color of Stain | Area of Stain (%) |
|---|---|---|
| OSB #1 | yellow | 60 |
| OSB #2 | mostly yellow, some blue | 90 |
| OSB #3 | mostly yellow, some brown | 70 |
| Overlaid OSB #1 | none | 0 |
| Overlaid OSB #2 | none | 0 |
| Overlaid OSB #3 | none | 0 |

In an alternate method, strands of wood flakes are coated with suitable amounts of binder and wax. The coated strands are formed into a mat that includes alternating layers of strands oriented generally perpendicular to one another. The mat is passed through a press at a temperature of from about 275° F. to about 475° F. for about 60 to about 600 seconds to obtain an oriented strand board core 12. The maximum pressure applied to the mat is preferably from about 600 psi to about 900 psi. The opposing sides of the OSB are sanded to obtain a desired thickness. The resin impregnated paper overlay 18 is then placed on the top surface of the oriented strand board core. Thereafter, the paper overlaid product is pressed in a hot press at a temperature of about 275° F. to about 475° F. for about 50 to about 300 seconds to obtain the finished paper overlaid wood product 10.

While the invention has been described in terms of its preferred embodiments, those skilled in the art will recognize that the invention can be practiced with modification within the spirit and scope of the appended claims.

What is claimed is:

1. A paper overlaid wood board comprising:

an oriented strand board core having a bottom surface and a top surface, said oriented strand board core including a plurality of strands, each of said strands being generally oriented parallel to one another;

a resin impregnated paper overlay adhesively secured to said top surface of said oriented strand board, said paper overlay having a basis weight of about 25 lbs./msf to about 75 lbs./msf and a resin content of about 20% to about 60% by dry weight.

2. The paper overlaid wood board of claim 1 wherein the density thereof is from about 35 $lb/ft^3$ to about 55 $lb/ft^3$, the modulus of rupture thereof is from about 3000 to about 9000 psi and the modulus of elasticity thereof is from about $0.4\times10^6$ to about $1.2\times10^6$ psi.

3. The paper overlaid wood board of claim 1 having a thickness of from about 0.25 inches to about 1.25 inches.

4. A paper overlaid wood board comprising:

an oriented strand board core having a bottom surface and a top surface, said core including a plurality of strands, some of which include extractives; and a resin impregnated paper overlay adhesively secured to the top surface of the oriented strand board, said paper overlay having a basis weight of about 25 lbs./msf to about 75 lbs./msf and a resin content of about 20% to about 60% by dry weight, whereby the paper overlay inhibits migration of the extractives from the top surface.

5. A paper overlaid wood board according to claim 4 wherein the resin impregnated paper includes kraft paper.

6. A paper overlaid wood board according to claim 5 wherein the strands are flakes of debarked Southern pine wood.

7. A paper overlaid wood board comprising:

an oriented strand board core having a bottom surface and a top surface, said core including a plurality of strands, some of which include extractives; and a resin impregnated paper overlay, which includes kraft paper, adhesively secured to the top surface of the oriented strand board, said paper overlay having a basis weight of about 25 lbs./msf to about 75 lbs./msf and a resin content of about 20% to about 60% by dry weight, whereby the paper overlay prevents the pop-up of strands from the top surface.

* * * * *

UNITED STATES PATENT AND TRADEMARK OFFICE

CERTIFICATE OF CORRECTION

PATENT NO. : 6,737,155 B1
APPLICATION NO. : 09/457183
DATED : May 18, 2004
INVENTOR(S) : Ou, Nian-hua It is certified that error appears in the above-identified patent and that said Letters Patent is hereby corrected as shown below:

Column 2, at line 30, the words “basic rate” should be deleted and replaced instead with the word --weight--.

Column 3, line 35, cancel “basis” from the line.

Column 3, line 40, cancel “basis” from the line.

Column 5, line 9, cancel “basis” from the line.

Column 6, line 1, cancel “basis” from the line.

Column 6, line 19, cancel “basis”.

Signed and Sealed this

Twenty-ninth Day of August, 2006

JON W. DUDAS
*Director of the United States Patent and Trademark Office*